No. 684,898. Patented Oct. 22, 1901.
F. J. ZECHER.
THILL COUPLING.
(Application filed Nov. 30, 1900.)
(No Model.)
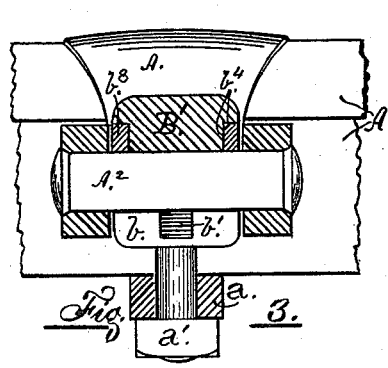
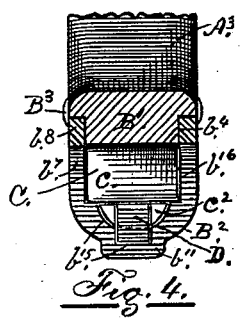
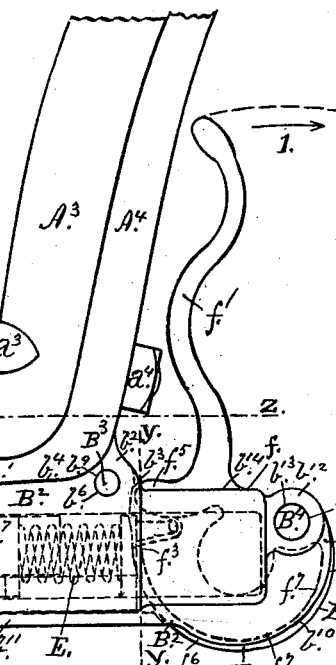
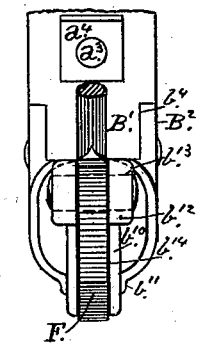
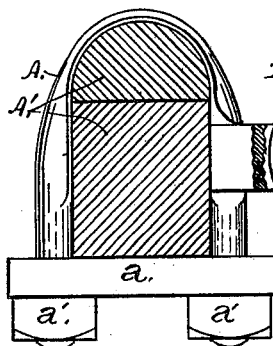
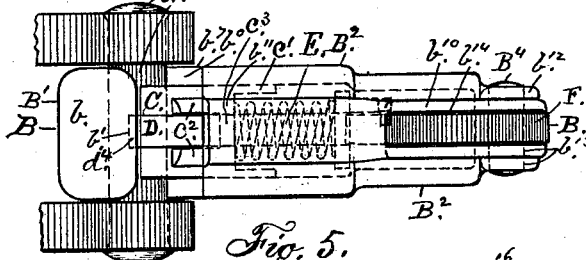
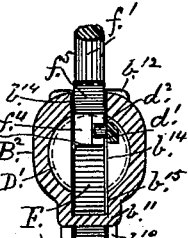
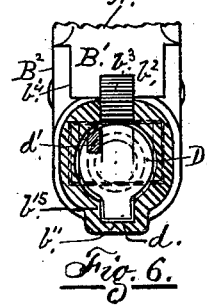
Witnesses:
Paul A. Herr.
Elliott Houseworth
Inventor:
Francis J. Zecher.
By Daniel H. Herr.
Attorney.
THE NORRIS PETERS CO., PHOTO-LITHO., WASHINGTON, D. C.

UNITED STATES PATENT OFFICE.

FRANCIS J. ZECHER, OF LANCASTER, PENNSYLVANIA, ASSIGNOR TO THE ZECHER COUPLER CO., OF LANCASTER, PENNSYLVANIA.

THILL-COUPLING.

SPECIFICATION forming part of Letters Patent No. 684,898, dated October 22, 1901.

Application filed November 30, 1900. Serial No. 38,146. (No model.)

*To all whom it may concern:*

Be it known that I, FRANCIS J. ZECHER, a citizen of the United States, residing at Lancaster, in the county of Lancaster and State of Pennsylvania, have invented certain new and useful Improvements in Thill-Couplings; and I do hereby declare the following to be a full, clear, and exact description of the invention, such as will enable others skilled in the art to which it appertains to make and use the same.

This invention relates to improvements in a thill-coupling of that class in which a hook, embracing practically one-half of the ordinary clip or coupling-bolt, is formed at the coupling end of the thill-iron, in which a slide-block with one end engaging the other half of said bolt is movable back and forth in a casing secured to said thill-iron, coupling and uncoupling, in which a second slide-block moves said former block back in uncoupling and assures security when coupling is completed, said second block being at one end of a stem with a side projecting disk at the other end and a coiled spring between the former block and said disk, and in which an end pivoted cam, operated by a lever, serves to move said blocks, coupling or uncoupling.

The object of the invention is the production of an effective coupling whereby a pair of thills, shafts, or a pole may be readily attached to or detached from the axle-clip of a vehicle without withdrawing or inserting the usual coupling-bolt of said clip, said coupling being safe, secure, and antirattling.

The elements of the invention will severally and at large appear in the following description, and they will be separately and combinedly set forth or pointed out in the appended claims.

The purposes of the invention are attained by the mechanisms, devices, and means illustrated in the accompanying drawings, with similar reference characters to designate like parts throughout the several views, in which—

Figure 1 is a full side elevation of a thill-coupling embodying the elements of the invention in coupled position with portions of thill and thill-iron broken away for want of room in the drawing and portions of the axle, clip, and bolt appearing in section; Fig. 2, an end view from the right of the lower portion of Fig. 1, with the axle and clip portions omitted. Figs. 3 and 4, respectively, are sections taken on the line $x\ x$ in Fig. 1; but the upper portions of the thill, thill-iron, and lever-arm are broken away in Fig. 4. Fig. 5 is an inverted plan of Fig. 1 with the axle portion omitted and the clip-iron broken away. Figs. 6 and 7 are sections taken on the line $y\ y$ in Fig. 1 with the portions above the line $z\ z$ broken away and the axle and clip omitted in Fig. 6. Fig. 8 is a side elevation of the coupler shown in Fig. 1 with parts appearing in section, portions broken away and the near side of the casing removed, showing the movable parts in the positions for uncoupling; Fig. 9, a plan and right-hand end elevation of the bolt-engaging block detached from Fig. 5; and Fig. 10, an elevation and direct plan of the slide-block securing and withdrawing block detached from Fig. 8.

In the drawings, A designates an ordinary thill-coupling clip, secured by a cross-piece $a$ and the nuts $a'$ to a vehicle-axle A', a portion only of which is shown; but the coupling-bolt A², after passing through the eyes of the ears of said clip, is shown to be rigidly secured in place thereto by having its extremities riveted, instead of the usual head and nut (not shown) on said extremities, while A³ designates the lower or rear end portion of an ordinary thill, and A⁴ the portion of a thill-iron secured thereto by the usual clip-headed bolt $a^3$, with the nut $a^4$ screwed home on its threaded end, all of which are old and form no part of the invention, the elements of which will now be described.

The drawings clearly show that the coupling device B, which is arranged at the lower end of the thill-irons, angularly disposed with reference thereto, according to the position the thills or poles will occupy when in use, or so that said device will be practically in horizontal position when coupling is completed and an animal or animals hitched thereto to move the coupled vehicle. The device consists of two classes of elements— the rigidly affixed or stationary and the movable or actuating—the first class constituting the hook and casing referred to in the opening paragraph hereto and the second class comprehending the rest of the elements therein mentioned. The casing consists of two portions B' and B². The portion B', Figs. 1, 4, and 8, is preferably an integral continuation of the thill-iron A⁴, before mentioned, of the required dimensions, having at its free end the required bolt-engaging hook $b$, with a slide-block engaging recess $b'$ in the end thereof, and at its attached end an end extension $b^2$ with a prescribed vertical face at its extremity, a vertical recess $b^3$ therein and rounded off to vanish in the surface of the thill-iron, as shown, while its side faces are provided with recesses $b^4$, with undercut ends $b^5$, and the end extension has a pin or bolt engaging orifice $b^6$ through its body; but the under surface of the portion with the inner surface of the hook, the vertical end face, the recess therein, and the side recesses are all preferably machine-finished to insure close contact therewith, and the portion B², Figs. 1, 4, and 8, is an oblong hollow body of prescribed dimensions, practically U-shaped in the forward part and practically cylindrical rearward thereof, with the rear or outer end of the cylindrical part closed and the forward or inner end $b^7$ of the U-shaped part open and hollowed out from below upward, as shown, forming a downwardly and inwardly curving recess $b^0$ of the required depth and width between the hook and the casing for the free passage of the clip coupling-bolt. The sides $b^8$ of the U-shaped part, through the longitudinal opening thereof, engage on the portion B', being fitted closely into its side recesses $b^4$ with their extremities in the undercut ends $b^5$, and through the sides are formed orifices $b^9$, registering with the orifice $b^6$ before mentioned, through which a bolt or pin B³ serves to secure the portions B' and B² rigidly together; but so that the portion B² may be readily removed when required, as for repairs. Rearward or outward of the cylindrical part, flush with its upper edge and along the lower surface thereof, is a practically semicircular extension $b^{10}$, continued in a longitudinal ridge $b^{11}$ to the forward edge of the U-shaped part, with bosses $b^{12}$ at the upper end of said extension and registering orifices $b^{13}$ through said bosses, through which a bolt or pin B⁴ serves to pivot a cam-disk yet to be described. Longitudinally through the body of the cylindrical part and through the semicircular extension is formed a prescribed vertical slot $b^{14}$, through which said cam-disk performs its functions, while in the bottom, within the U-shaped part and above the ridge $b^{11}$, is formed a prescribed recess or groove $b^{15}$, extending from the forward or open end of said part and terminating in said slot, and in the inner surfaces of the side walls of said part and extending throughout the length thereof are formed prescribed grooves or recesses $b^{16}$.

A block C, Figs. 1, 4, 5, 8, and 9, being the first or main slide-block, before mentioned, having in one end thereof a semicircularly-concaved recess $c$ and on the other end side extending wings or ears $c'$ and longitudinally on one surface, preferably the under, projecting ridges or ribs $c^2$, with their extremities flush with its eared end, joined by a wall $c^3$, forming a recess $c^4$, is seated in the grooves $b^{16}$, before mentioned, so as to be movable back and forth therein.

A block D, Figs. 1, 4, 5, 8, and 10, being the second or suplementary slide-block, before mentioned, having flush with one edge thereof an end extending strip $d$ with a side projecting circular disk D' at its free end, said disk having near the edge opposite the strip an outwardly-projecting lug or finger $d'$ with a side projecting pin or nipple $d^2$ adjacent to its free end or extremity and an outwardly-curving groove or recess $d^3$ cut into the surface of the disk adjacent to the base or foot of said lug, is arranged so as to engage in the recess $c^4$, before mentioned, with the strip $d$, seated or engaging in the groove $b^{15}$, also before mentioned, and the end $d^4$ of the block engaging in the recess $b'$ of the hook, as shown.

A spiral or coiled spring E, Figs. 1, 5, and 8, of approved dimensions, strength, and resiliency is arranged between the block C and the disk D', with one end of said spring seated on the side-eared end of said block and its other end engaging against the adjacent surface of said disk, pressing the block and disk apart and holding the block D within the recess $c^4$ and its inner end against the wall $c^3$, as will be the case when said block C is withdrawn from engagement with the bolt A², opening the recess $b^0$ for coupling and uncoupling.

A cam F, Figs. 1, 2, 7, and 8, of approved dimensions and required shape is arranged within the slot $b^{14}$, before mentioned, practically filling the same, having a practically straight upper edge $f$, from which projects, at the required angle, any approved lever-arm, handle, or stem $f'$, being provided at the required point with an orifice $f^2$, engaged by a bolt or pin B⁴, also before mentioned, pivoting the cam in place, rounded off about the pivot-point and continued practically in the general contour of the semicircular extension $b^{10}$, likewise before mentioned, to a point $f^3$ slightly beyond the axial or center line of the disk D' and the block C, as shown, where said disk is provided crosswise of its edge with a cut-out forming a recess $f^4$ for the free passage of the lug $d'$ with the nipple $d^2$, preventing all possibility of their contacting therewith, said recess with the top edge forming a finger $f^5$ with its rounded end engaging in the recess $b^3$, while from said finger, about the center, close to and partially around the pivot-point, the side of the disk is cut away or recessed, so as to form a marginal or side rib $f^6$ from said pivot-point around to said point $f^3$, the inner wall or face of said rib constituting a cam-track $f^7$, which track is adapted to engage against or on the inner or under side of said pin or nipple $d^2$ when said disk is rotated or turned on its pivot-pin $B^4$ by moving the lever-arm, handle, or stem $f'$, either from or to the position shown in Fig. 1.

Now the several elements hereinbefore described and set forth and occupying the respective positions indicated or illustrated in the accompanying drawings, the following observations will be noted: first, that the end concaved block C, by engaging the half of the bolt $A^2$ not engaged by the hook $b$, crosses the recess $b^0$, completing the act of coupling; second, that the block D in extending across the recess $b^0$ and having its end $d^4$ in the end recess $b'$ of said hook by means of the connecting-strip $d$ and the disk D', engaged by the cam F, adds to the safety of said completed coupling; third, that the spring E by being compressed between the block C and the disk D', by reason of said engagement with the cam F, is longitudinally or axially extensible and serves to hold said block in close contact with the bolt $A^2$, making the coupling to be antirattling; fourth, that should the spring E break or otherwise fail to act extensibly the block D, by reason of the engagement of the cam F on the disk D', will be held in position across the recess $b^0$ and prevent uncoupling; fifth, that the point of contact between the disk D' and the cam F being below the pivot-center $B^4$ of the cam any forward pressure on the coupling mechanism, as by backing of the team, will exert a downward pressure on the cam at said point of contact or a tightening effect; sixth, that by moving the stem $f'$ the required distance in the direction indicated by the arrow 1 will rotate the cam F upwardly on its pivot, bring the surface $f^7$ of the rib $f^6$ into engagement under the pin $d^2$, and by reason of said engagement withdraw the block D into the recess $c^4$, and its inner end engaging against the wall $c^3$ the block C will also be withdrawn and the recess $b^0$ opened, when through said opened recess the device may be readily removed or uncoupled, and, seventh, that by reversing this latter operation or inverting the process, the peripheral edge of the cam engaging on the outer surface of the disk D', the device may just as readily be again placed in the position shown or coupled.

Having thus shown or described the invention and ascertained and set forth the manner in which it is performed, what is considered new, and desired to be secured by Letters Patent, is—

1. A thill-coupling comprising: a thill-iron having an extension with a bolt-encircling hook at the free end thereof, said hook embracing one half of the bolt and having a locking-recess in its open end edge; a casing secured to said extension, and having a bolt entering opening between the casing and hook; a slide-block with a semicircular recess in the forward end thereof, and movable back and forth in said casing, said recess adapted to embrace the other half of said bolt; and, a second slide-block, a coiled spring, and a pivoted disk cam provided to move and securely hold or lock said former slide-block, substantially as described and for the purpose hereinbefore set forth.

2. In a thill-coupling with a thill-iron having an end extension with a bolt-embracing hook at the free end thereof and a locking-recess in its extremity, a casing removably secured to said extension, said casing having a U-shaped part, a cylindrical part, and a rearward, downward and underneath semicircular extension continued in an underlying ridge to the forward end of said U-shaped part, with a bolt-entering cut-out at said forward end, a longitudinal slot, $b^{14}$, through the top of said cylindrical part and said semicircular extension, with a strip-guide groove, $b^{15}$, and bolt-engaging block-guide recesses, $b^{16}$, with casing-securing orifices, $b^9$, and the cam-pivot orifices, $b^{18}$, substantially as described and for the purpose hereinbefore set forth.

3. In a thill-coupling having a bolt-engaging hook and a casing with a forward end cut-out, and guide-recesses, $b^{16}$, a slide-block, C, movable back and forth in said recesses, said block having a bolt-engaging end, $c$, side end extensions, $c'$, with under-surface ribs, $c^2$, and an end joining wall, $c^3$, and a recess, $c^4$, formed by said ribs and wall, with mechanism provided to move and hold said block, substantially as described and for the purpose hereinbefore set forth.

4. In a thill-coupling having a bolt-engaging hook with a recess, $b'$, in the end thereof, a casing with a forward end recess, $b^0$, between the hook and casing, and a slide-block, C, movable back and forth in the casing, said casing having a groove, $b^{15}$, and said block a recess, $c^4$, a securing-block, D, with a forward end nose, $b^4$, and a longitudinal stem, $d$, having a side projecting disk D', with a longitudinally-projecting lug, $d'$, having a side projecting cam-engaging pin, $d^2$, and a disk-recess, $d^3$, at the base thereof, said block movable back and forth in the casing and across said recess, $b^0$, and having its nose or end $d^4$, in said recess, $b'$, its stem, $d$, in said groove, $b^{15}$, and its body in said recess, $c^4$, and in combination, a coiled spring, E, engaging between said block, C, and said disk, D', with mechanism provided to move and hold said combination, all substantially as described and for the purpose hereinbefore set forth.

5. In a thill-coupling having a thill-iron with an extension having a bolt-embracing hook at the coupling end thereof, with a block-engaging recess in its extremity, and a casing removably secured to said extension with a bolt-receiving recess, $b^0$, between the casing and hook, and a longitudinal slot $b^{14}$, in the outer end of the casing; said casing having the combination of a block, C, with a recess, $c^4$, a block, D, with a stem, $d$, and a side disk, D', at the free end of said stem, and a coiled spring, E, between said block, C, and disk, D', movable back and forth therein; said disk, D', having a longitudinally-projecting lug, $d'$, with a cam-engaging side pin, $d^2$, all as shown, a practically semicircular disk-cam, F, having a practically straight upper edge, $f$, with a projecting stem, $f'$; at a prescribed point, a pivot-orifice, $f^2$, and diametrically opposite a contact-point, $f^3$; adjacent to and above said latter point, a cut-out opening $f^4$, and a forwardly-projecting finger, $f^5$, formed by said opening and said upper edge; and a recessed side from said opening to near said pivot-orifice, forming a side rib, $f^6$, therebetween and adjacent to the peripheral edge, said edge to constitute a convex cam to engage against said disk, D', and the inner surface, $f^7$, of said rib, a concaved cam to engage on the lug-pin, $d^2$, of said disk, D'; said disk-cam fitting into the slot, $b^{14}$, with a bolt, $D^4$, through the orifice, $f^2$, and through the sides of the casing to pivot the cam in place; all substantially as described and for the purpose hereinbefore set forth.

In testimony whereof I affix my signature in presence of two witnesses.

FRANCIS J. ZECHER.

Witnesses:
FRED. P. MENTZER,
LEWIS A. RAUCH.